US006447130B2

(12) United States Patent
Chu

(10) Patent No.: US 6,447,130 B2
(45) Date of Patent: Sep. 10, 2002

(54) CONSOLIDATED EXTERIOR SIDEVIEW MIRROR ASSEMBLY INCORPORATING AN IN-MOLD FILM PROCESS

(75) Inventor: Tun-Jen Chu, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/882,763

(22) Filed: Jun. 15, 2001

Related U.S. Application Data

(62) Division of application No. 09/564,665, filed on May 1, 2000, now Pat. No. 6,310,738.

(51) Int. Cl.⁷ .............................................. G02B 5/08
(52) U.S. Cl. .................... 359/883; 359/884; 156/61; 156/245; 156/277
(58) Field of Search .................. 359/883, 884; 428/79, 68, 31; 156/61, 63, 245, 277; 264/132, 133, 241, 259, 297.2; 427/8, 162, 407.1; 40/668, 661.11, 661.04, 315

(56) References Cited

U.S. PATENT DOCUMENTS

| | | | |
|---|---|---|---|
| 5,058,647 A | 10/1991 | Gartland et al. | 152/524 |
| 5,239,405 A | 8/1993 | Varaprasad et al. | 359/272 |
| 5,338,566 A | * 8/1994 | Gregory et al. | 427/162 |
| 5,406,414 A | 4/1995 | O'Farrell et al. | 359/604 |
| 5,474,837 A | 12/1995 | Duke, Jr. et al. | 428/236 |
| 5,497,306 A | 3/1996 | Pastrick | 362/83.1 |
| 5,668,663 A | 9/1997 | Varaprasad et al. | 359/608 |
| 5,669,704 A | 9/1997 | Pastrick et al. | 362/83.1 |
| 5,669,705 A | 9/1997 | Pastrick et al. | 362/83.1 |

FOREIGN PATENT DOCUMENTS

DE 4039484 6/1992

OTHER PUBLICATIONS

U.S. Pat. application Ser. No. 09/482,199, filed Jan. 12, 2000, entitled Outside Sideview Mirror Assembly with Reduced Wind Noise.
U.S. Pat. application Ser. No. 09/478,315, filed Jan. 6, 2000, entitled Exterior Mirror Plano–Auxiliary Reflective Element Assembly.

*Primary Examiner*—Mohammad Sikder
(74) *Attorney, Agent, or Firm*—Van Dyke, Gardner, Linn & Burkhart, LLP

(57) ABSTRACT

A method of forming a mirror housing according to the present invention includes providing a molding apparatus having a molding cavity, placing a film appliqué in the mold cavity and injecting a polymer into the mold cavity over at least a portion of a side of the film appliqué to form a housing wall of the mirror housing wherein the film appliqué adheres to the substrate forming the housing wall. Preferably, the mold apparatus comprises an injection molding apparatus which injects a heated polymer into the mold cavity for forming the housing wall of the mirror housing. The film appliqué preferably matches the color of the vehicle or provides a color accent, wood grain finish, or a metallic finish or the like to provide a decorative appearance to the mirror assembly but without the noise associated with the conventional detachable skull cap designs. The present invention also provides a vehicular exterior sideview mirror assembly which includes a mirror housing that is adapted for mounting to a vehicle. The mirror housing is formed by molding and has a housing wall that defines a cavity and an opening for facing rearward of the vehicle when the mirror assembly is mounted to the vehicle. A reflective element is provided in the cavity for rearward viewing of the vehicle. In addition, the mirror housing has a forward facing side when the mirror assembly is mounted to the vehicle with at least a portion of the forward facing side including a decorative film appliqué molded therewith to provide a decorative function for the mirror assembly.

23 Claims, 8 Drawing Sheets

U.S. PATENT DOCUMENTS

| | | | |
|---|---|---|---|
| 5,724,187 A | 3/1998 | Varaprasad et al. | 359/608 |
| 5,783,276 A * | 7/1998 | Lyford | 264/241 |
| 5,823,654 A | 10/1998 | Pastrick et al. | 362/83.1 |
| 5,863,116 A | 1/1999 | Pastrick et al. | 362/494 |
| 5,879,074 A | 3/1999 | Pastrick | 362/494 |
| 5,900,999 A | 5/1999 | Huizenga et al. | 359/877 |
| 5,910,854 A | 6/1999 | Varaprasad et al. | 359/273 |
| 5,935,663 A * | 8/1999 | Duzac | 156/61 |
| 5,949,591 A | 9/1999 | Whitehead | 359/841 |
| 5,959,790 A | 9/1999 | Hempelmann | 359/841 |
| 5,986,354 A | 11/1999 | Nagao et al. | 307/64 |
| 6,109,586 A | 8/2000 | Hoek | 248/476 |
| 6,116,743 A | 9/2000 | Hoek | 359/871 |
| 6,149,287 A | 11/2000 | Pastrick et al. | 362/494 |
| 6,168,279 B1 | 1/2001 | Schnell | 359/872 |
| 6,176,602 B1 | 1/2001 | Pastrick et al. | 362/494 |
| 6,178,680 B1 * | 1/2001 | Sloot | 40/661.04 |
| 6,322,866 B1 * | 11/2001 | Sloot | 2/246 |

* cited by examiner

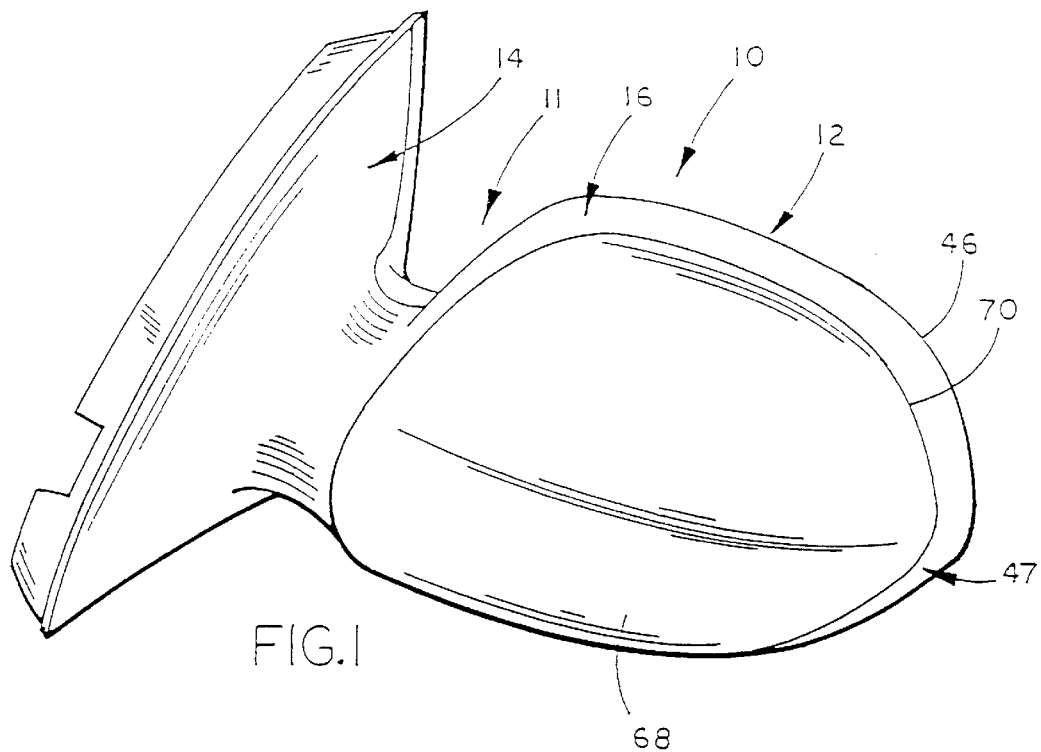
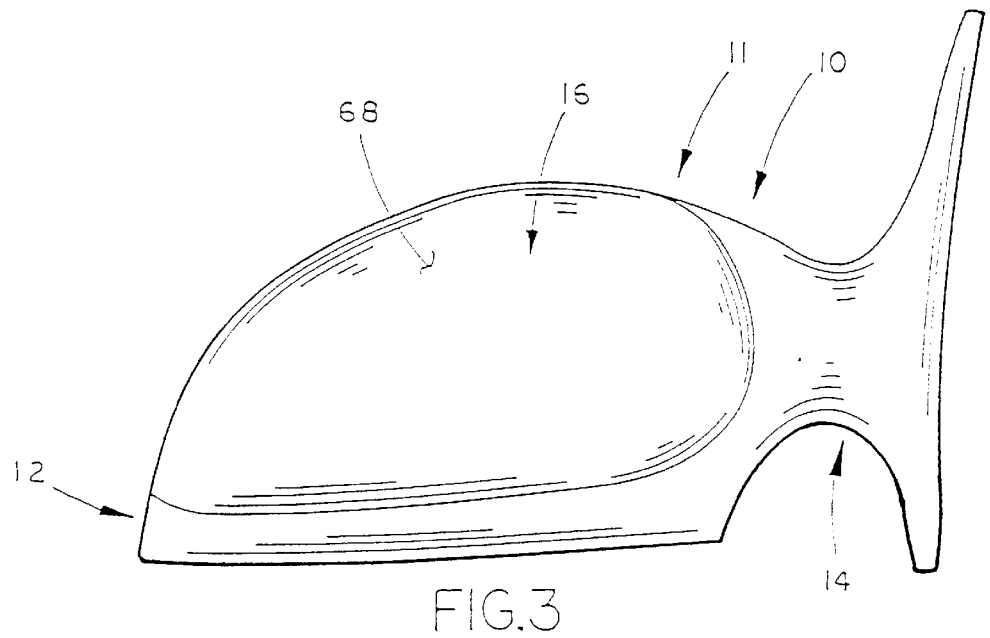

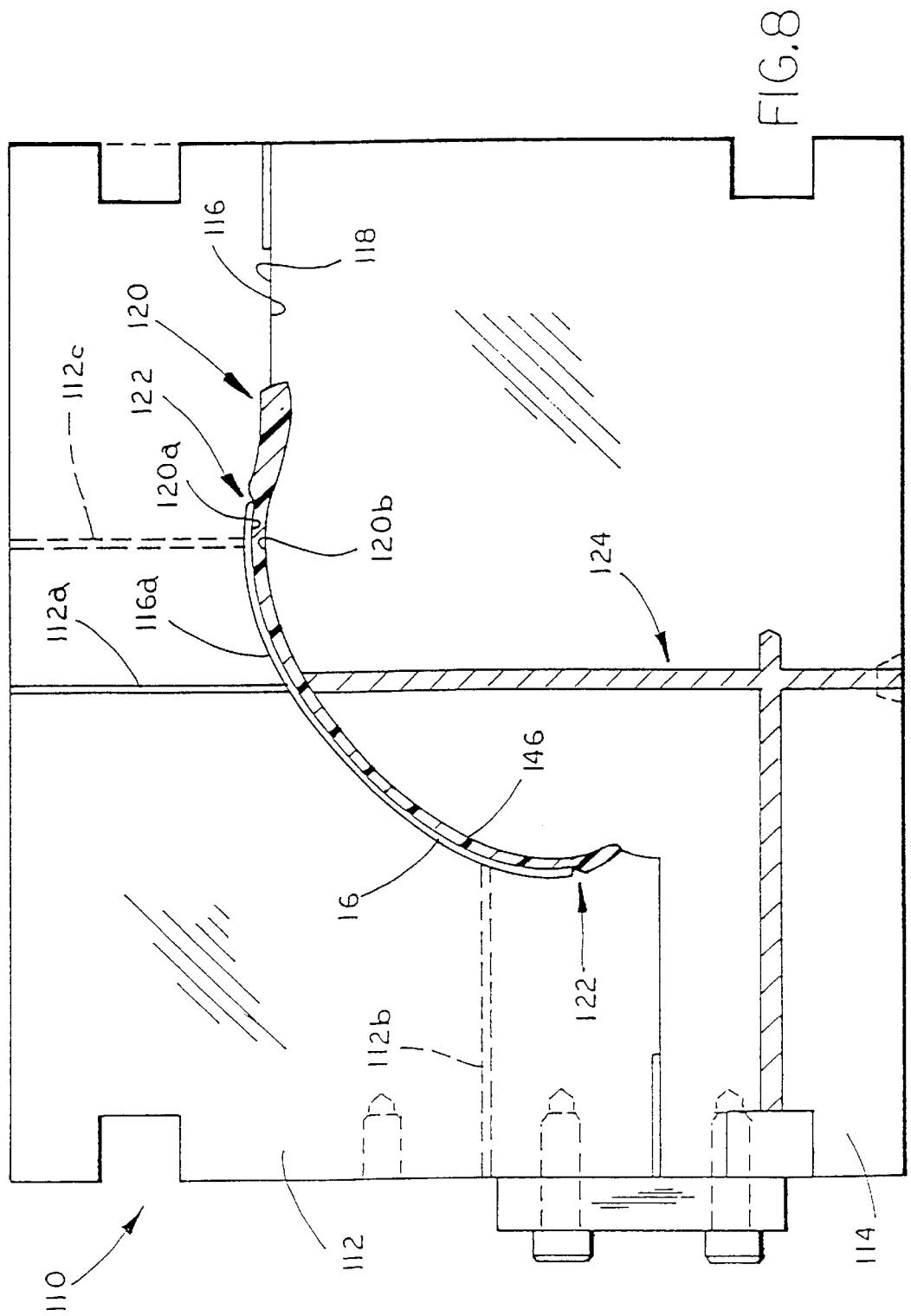

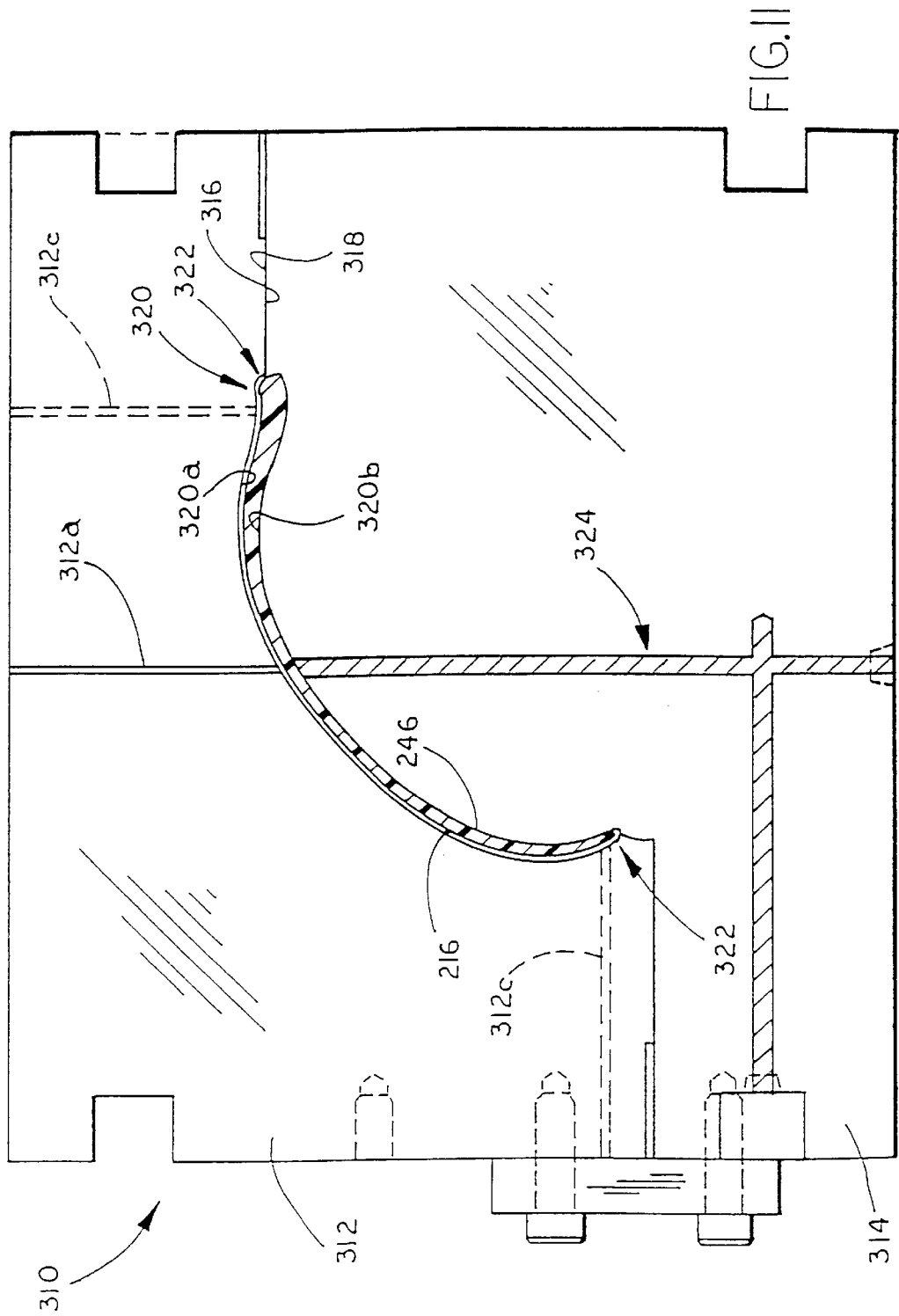

CONSOLIDATED EXTERIOR SIDEVIEW MIRROR ASSEMBLY INCORPORATING AN IN-MOLD FILM PROCESS

This application is a divisional application of application Ser. No. 09/564,665, filed May 1, 2000, by Applicant Tun-Jen Chu, entitled CONSOLIDATED EXTERIOR SIDEVIEW MIRROR ASSEMBLY INCORPORATING AN IN-MOLD FILM PROCESS, U.S. Pat. No. 6,310,738, which is incorporated by reference in its entirety.

TECHNICAL FIELD AND BACKGROUND OF THE INVENTION

The present invention generally relates to an exterior sideview mirror assembly suitable for mounting on a vehicle and, more particularly, to an exterior sideview mirror assembly which incorporates a film appliqué to provide a decorative appearance to the assembly.

More recently, the trend in exterior sideview mirror assemblies has been to provide housings for the exterior sideview mirror assemblies that match the body of the vehicle. In addition, these housings are often molded with their respective mounting arms or "sails" to provide a unitary housing which exhibits enhanced aerodynamic characteristics. However, in an attempt to reduce the cost of manufacturing such assemblies, a composite assembly has been developed which includes a base housing or frame and a shell or skull cap which is mounted to the frame, for example by snap connectors. The frame is formed from an engineering plastic, typically reinforced engineering plastic, such as reinforced nylon or the like. The shell or skull cap is formed from a plastic substrate which is then painted to match the vehicle body color. The structural capacity of the housing is provided by the frame, with the shell providing a decorative covering over at least a portion of the frame so that the housing generally matches the vehicle body. In some cases, however, these sideview mirror assemblies have exhibited increased wind noise. This wind noise is generated, such as, by the gap between the decorative shell and the frame of the mirror assembly.

Various attempts have been made to minimize and/or eliminate the wind noise. One approach is to eliminate the gap between the decorative shell and the frame. However, in order to eliminate this gap, the tolerances on the respective parts must be extremely tight which adds to the expense of the sideview mirror assembly, thus effectively eliminating the savings achieved by the skull cap design. Another approach is to alter the surface topology of the decorative shell to separate the air flow over the exterior sideview mirror assembly, which reduces the noise of the wind flow.

For example, in German Pat. No. 4,039,484 to Bayerische Motoren Werke AG, a plurality of raised portions or "bumps" are provided to separate the air flow over the housing. However, these raised portions are not aesthetically pleasing to some automobile manufactures and, further, project above the housing potentially creating a distraction to the driver. In addition, it has been found that when a discontinuity is introduced into the substrate of the skull cap (such as when it is molded into a molding tool), that the noise reduction advantages of the surface molded discontinuity is significantly reduced by the painting process since the painting process alters the surface topology of the substrate. Rather than following the surface discontinuities, the paint partially fills in the discontinuities.

More recently in copending U.S. patent application Ser. No. 09/482,199, entitled OUTSIDE SIDEVIEW MIRROR ASSEMBLY WITH REDUCED WIND NOISE, filed Jan. 12, 2000, by Leo W. Pavao and Tun-Jen Chu, commonly assigned to Donnelly Corporation, which is herein incorporated reference in its entirety, a skull cap incorporating wind noise reduction features is disclosed that uses a film to provide the desired decorative appearance but which maintains the definition of the wind noise reduction features of the skull cap so that the noise reduction features are maintained even after the skull cap is decorated.

While these decorative covers offer unique styling and assembly and, further, have resolved the wind noise problems associated with conventional skull caps, these decorative covers still increase the number of parts and hence the assembly time as compared to conventional unitary sideview mirror designs. Consequently, there is a need for an exterior sideview mirror assembly which includes a unique outer surface for matching the vehicle to which the assembly is to be mounted to provide an aesthetic appearance of the mirror assembly without the noise associated with conventional skull cap designs while reducing the number of parts.

SUMMARY OF THE INVENTION

The present invention provides an exterior sideview mirror assembly which incorporates a film appliqué that preferably matches the color of the vehicle body to provide a decorative appearance to the mirror assembly. The film appliqué is molded with the housing substrate and as a result eliminates the gap associated with conventional skull cap designs.

According to one form of the invention, a method of forming a mirror housing includes providing a molding apparatus having a mold cavity, placing a film appliqué in the mold cavity, and injecting a polymer into the mold cavity over at least a portion of a side of the film appliqué to form a housing wall of the mirror housing wherein the film adheres to the substrate forming the housing wall.

In further aspects, the mold apparatus comprises an injection molding apparatus which injects a heated polymer into the mold cavity.

In other aspects, the film appliqué is restrained in the mold cavity when the polymer is injected into the mold cavity. For example, the mold cavity may be configured to restrain the film appliqué in the mold cavity, including by forming a projection on a side of the mold cavity. The projection assists in holding to film appliqué in the mold cavity. In other aspects, the film is held in place by a vacuum. In yet another aspect, a primer is provided on at least the portion of the film appliqué to increase the adhesion of the film appliqué to the substrate forming the housing wall.

In another form of the invention, a vehicular exterior sideview mirror assembly includes a mirror housing which is adapted for mounting to a vehicle. The mirror housing is formed by molding and has a housing wall that defines a cavity and an opening for facing rearward of the vehicle when the mirror assembly is mounted to the vehicle. A reflective element is provided in the cavity for rearward viewing of the vehicle. In addition, the mirror housing has a forward facing side when the mirror assembly is mounted to the vehicle, with at least a portion of the forward facing side including a decorative film appliqué molded therewith to provide a decorative function for the mirror assembly.

In one aspect, the film appliqué comprises a film laminate. For example, the film laminate may include at least one backing sheet and at least one coating over the backing sheet. The coating preferably has a color either for matching the vehicle body paint, for providing an accent color, or for providing a metallic appearance. In further aspects, the film laminate has a thickness in a range of about 10 to 60 mils, more preferably, in a range of about 12 to 35 mils and, most preferably, in a range of about 15 to 30 mils.

In other aspects, the housing includes a styling feature which visually distinguishes the film appliqué from the housing wall to simulate a removable skull cap mirror design. In further aspects, the housing of the exterior mirror assembly comprises a polymer resin, for example a filled polymer resin, including a filled polypropylene.

According to another form of the invention, a vehicular sideview exterior mirror assembly includes a reflective element and a mirror housing which is adapted to mount to a vehicle. The mirror housing includes a mirror casing having a casing wall which defines a cavity and an opening for facing rearward of the vehicle when the vehicular sideview exterior mirror assembly is mounted to the vehicle. The mirror assembly further includes a reflective element in the cavity for rearward viewing of the vehicle when the vehicular sideview exterior mirror assembly is mounted to the vehicle. The mirror casing wall has at least a portion thereof decorated with a film appliqué, which is molded on the portion of the mirror casing wall and provides a decorative function to the vehicular sideview exterior rearview mirror assembly. For example, the film appliqué may be molded with the portion by injection molding.

In other aspects, the mirror casing wall includes a styling feature that visually distinguishes the film appliqué from the casing wall to simulate a removable skull cap mirror assembly design.

In yet other aspects, the film appliqué comprises a film laminate and includes at least one backing sheet and at least one coating over the backing sheet. The coating has a color which either generally matches the vehicle body paint, includes an accent color, or provides a metallic appearance.

In another form of the invention, a molding apparatus for forming a mirror housing for a vehicle mirror assembly includes a first mold plate having a first facing surface and a second mold plate having a second facing surface. The first and second facing surfaces define therebetween a mold cavity. The first mold plate is adapted to hold a film appliqué therein, with the second mold plate having at least one injection port through which a polymer is injected into the mold cavity for forming a housing wall of the mirror housing along with the film appliqué positioned in the cavity.

In other aspects, the first side of the mold cavity includes a projection to assist holding the film appliqué in the mold cavity. For example, the projection may comprise a peripheral ridge, which encircles the film appliqué.

It can be appreciated from the foregoing that a unitary or one piece mirror housing is provided or formed that offers the same styling features as a painted unitary molded mirror housing or a conventional skull cap design but without the associated expense. These and other features, purposes and advantages will be appreciated more fully when the drawings are viewed in conjunction with the detailed description which follows.

BRIEF DESCRIPTION OF THE DRAWINGS

FIG. 1 illustrates a perspective view of an exterior sideview mirror assembly incorporating a film appliqué of the present invention;

FIG. 3 is a top plan view of the exterior sideview mirror assembly of FIG. 1;

FIG. 8 is a cross-section of a mold apparatus for forming the housing of the present invention;

FIG. 11 is a cross-section of a second embodiment of a mold apparatus for forming a housing of present invention.

DETAILED DESCRIPTION OF THE PREFERRED EMBODIMENTS

Figure 2:
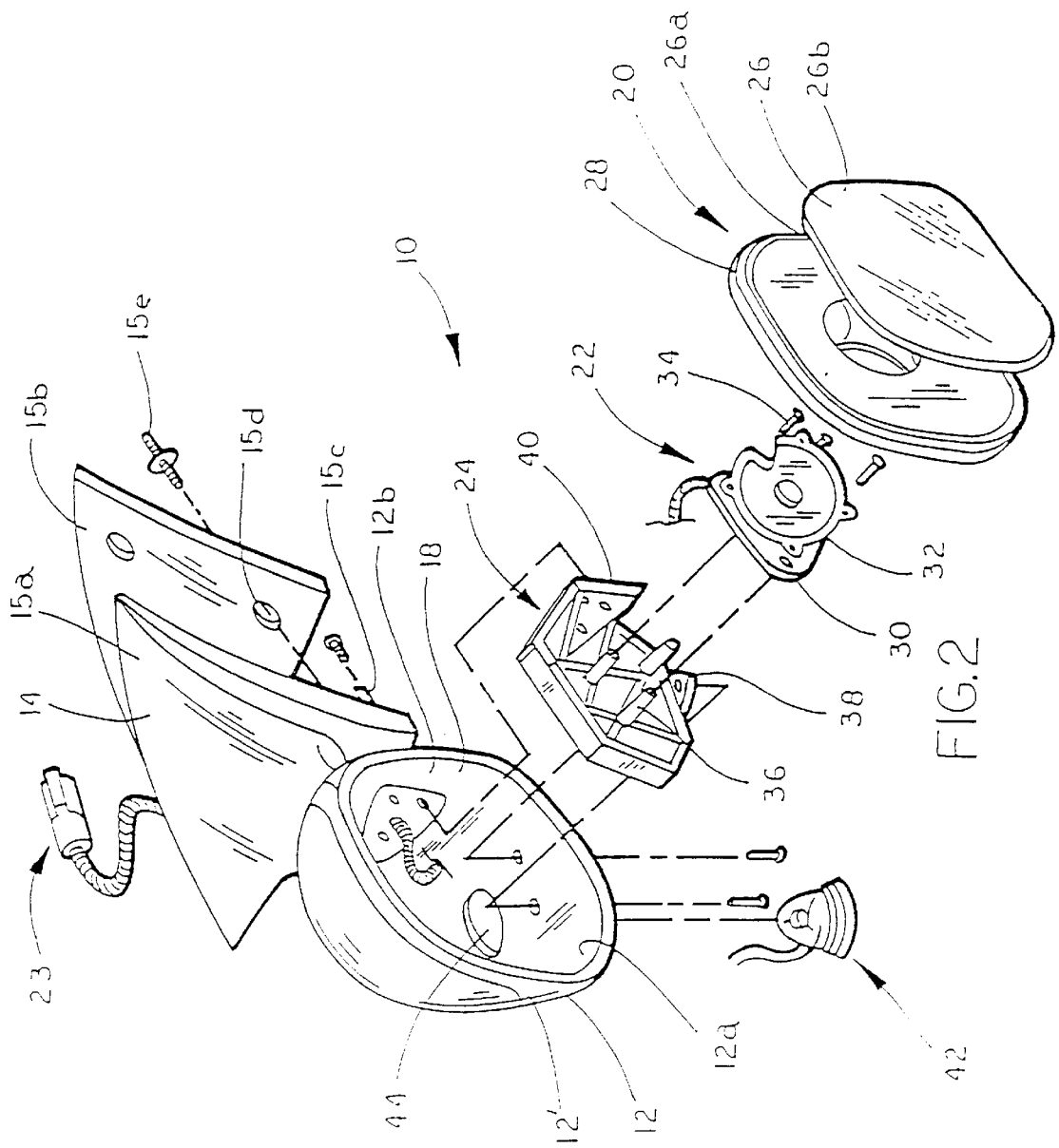
FIG. 2 is an exploded perspective view of the exterior sideview mirror assembly of FIG. 1.

Referring to FIG. 1, the numeral 10 generally designates a vehicular exterior sideview mirror assembly of the present invention. Sideview mirror assembly 10 includes a mirror housing 11 comprising a mirror casing 12 and a mounting bracket or sail 14 which mounts mirror casing 12 to the vehicle. In the illustrated embodiment, mirror casing 12 is integrally formed with sail 14; however, it should be understood that mirror casing 12 and sail 14 may be separately formed with mirror casing 12 being mounted to sail 14, for example by a break-away mounting arrangement as is conventionally known. As will be more fully described below, a film appliqué 16 is molded to at least a portion of mirror casing 12, for example to a forward facing side, to provide a decorative appearance or function to mirror assembly 10. Film appliqué 16 preferably has a high gloss finish and, more preferably, a colored high gloss finish and, most preferably, with a high gloss finish having a color that matches the body paint of the vehicle to which the mirror assembly is to be mounted or provides an accent color, a wood grain appearance, or a metallic appearance.

Mirror casing 12 and sail 14 are preferably molded from an engineered polymer resin, such as reinforced or filled polymer resin. Such filled polymer resins include filled polypropylene, such as a mineral filled polypropylene including a glass filled polypropylene. Referring to FIG. 2, casing 12 includes a rearward facing opening 18 in which reflective element assembly 20 is generally positioned for rearward viewing when the assembly is mounted to a vehicle. Reflective element assembly 20 includes a reflective element 26 and a backing plate 28 which supports reflective element 26 and, further, provides a mounting surface for an actuator 22 described below. Attachment of reflective element 26 to backing plate 28 can be achieved by a mechanical attachment, such as by a tab, clip, or fastener or may be by an adhesive attachment such as by a silicone adhesive, a urethane adhesive or similar adhesive material, such as a tape coated on both surfaces with a pressure sensitive adhesive to form a double sticky tape.

Reflective element 26 preferably comprises a reflector coated glass substrate. For example, reflective element 26 may comprise a flat glass substrate coated with a metallic reflector coating, such as a chromium coating, a titanium coating, a rhodium coating, a metal alloy coating, such as a nickel alloy coating, a silver coating, an aluminum coating, or any alloy or combination of these metal reflectors. The metal reflector coatings for reflective element 26 may comprise a first surface coating, such as on outer surface 26b of reflective element 26, or a second surface coating, such as on rearward surface 26a of reflective element 26, as such terms are known in the mirror art. In addition, the reflective coating on reflective element 26 may also comprise a dielectric coating or multi-layer of dielectric coatings or a combination of metal layers and dielectric layers to form an automotive mirror reflective element as is known in the art. Furthermore, reflective element 26 may comprise an electro-optic reflector element, such as an electrochromic reflector element, which exhibits a variable reflectance level, also as is known in the art.

It should also be understood that reflective element assembly 20 may include a curved reflector such as a convex, spherically curved reflector or a multi-radiused, preferably aspheric, curved reflector. Furthermore, reflective element assembly 20 may include a plano-auxiliary reflective element assembly as described in co-pending application entitled EXTERIOR MIRROR PLANO-AUXILIARY REFLECTIVE ELEMENT ASSEMBLY, Ser. No. 09/478, 315, filed Jan. 6, 2000, by Niall R. Lynam, which is commonly assigned to Donnelly Corporation, which is hereby incorporated by reference in its entirety.

Where reflective element 26 comprises an electrochromic element, for example, the electrochromic element typically includes a front substrate and a rear substrate with an electrochromic medium disposed between the substrates. A suitable electrochromic medium includes a solid polymer matrix electrochromic medium, for example such as disclosed in U.S. patent application Ser. No. 09/350,930, filed Jul. 12, 1999, entitled ELECTROCHROMIC POLYMERIC SOLID FILMS, MANUFACTURING ELECTROCHROMIC DEVICES USING SUCH FILMS, AND PROCESS FOR MAKING SUCH SOLID FILMS AND DEVICES, to Desaraju V. Varaprasad et al., or such as disclosed in U.S. Pat. Nos. 5,668,663; 5,724,187; 5,910,854; and 5,239,405, the disclosures of which are incorporated in their entireties by reference herein. Most preferably, in such laminate type electrochromic mirror reflective elements, the front substrate comprises a glass plate having, for example a thickness of less than about 0.1 mm, most preferably about 1.1 mm thickness or lower, and the rear substrate comprises a glass plate, for example having a thickness equal to or greater than about 1.6 mm and, more preferably greater than about 1.8 mm thickness, most preferably equal to or greater than about 2.0 mm thickness. The rear most surface of the rear substrate (the fourth surface as is known in the mirror art) is coated with a high reflecting metal film such as of aluminum or silver, or an alloy of aluminum or of silver. Most preferably, the front most surface of the rear substrate (the third surface as is known in the mirror art) is reflector coated with a high reflecting metal film such as aluminum or silver, or an alloy of aluminum or of silver. It should be understood that other reflective elements or reflective element assemblies may also be incorporated into sideview mirror assembly 10.

As best understood from FIG. 2, reflective element 20 is mounted in mirror casing 12 by actuator 22. Actuator 22 provides adjustment to the orientation of reflective element assembly 20 in response to a control 23. Control 23 may comprise a handset control that allows a driver to manually adjust the orientation of the reflective element assembly 20, for example by a lever control or by a cable control such as a Boden cable control, which repositions in a rearward field of view with reflective element assembly 20 in exterior rearview mirror assembly 10. Alternately, actuator 22 may comprise an electrical actuator, which includes at least one motor and at least one telescoping positioning member. In which case, control 23 may comprise a switch or a memory controller such as is known in the automobile art.

Again referring to FIG. 2, actuator 22 supports reflective element assembly 20 in casing 12 on a mounting bracket 24. Mounting bracket 24 may be mounted to casing 12 or may comprise a bracket which directly mounts to the vehicle, as is conventionally known in the art. In preferred form, actuator 22 comprises an electric actuator which includes an actuator housing 30 and a pivot member 32, which is pivoted about actuator housing 30 by a plurality of telescoping members which extend from and retract into housing 30, as will be understood by those skilled in the art. Pivot member 32 is secured to backing plate 28 by a plurality of fasteners 34 such that when the telescoping members are driven or actuated to extend or retract into actuator housing 30, the orientation of the reflective element assembly 20 is moved about one or more axes to adjust the orientation of reflective element 26 in casing 12. Actuator housing 30 is rigidly mounted to bracket 24 on a plurality of mounting bosses 36 and may be either heat staked or secured to mounting bosses 36 by fasteners, as will be understood by those skilled in the art.

In the illustrated embodiment, bracket 24 is mounted to mirror casing 12 by a plurality of fasteners which extend through a bottom wall 12a of mirror casing 12 into corresponding mounting tabs 38 provided on bracket 24. In addition, bracket 24 includes a mounting flange 40 which is secured to side wall 12b of mirror casing 12, similarly by a plurality of fasteners. In this manner, actuator housing 30 is rigidly mounted in mirror casing 12. It should be understood that mirror assembly 10 may include a fixed reflective element assembly or include other actuators, such as a manual actuator or a remote manual actuator such as a BODEN cable actuator. In addition, for further details of suitable actuators reference is made to copending application entitled PIVOT SUPPORT FOR ADJUSTABLE REARVIEW MIRROR, Ser. No. 09/047,846, filed Mar. 25, 1998, now U.S. Pat. No. 6,168,279, and to U.S. Pat. Nos. 5,900,999; 5,986,354, all commonly assigned to Donnelly Corporation of Holland, Mich., the disclosures of which are herein incorporated by reference in their entireties. An example of a suitable mounting bracket can be found in pending U.S. Pat. application entitled FILLED POLYOLEFIN MIRROR SUPPORT, Ser. No. 09/097,480, filed Jun. 15, 1998, now U.S. Pat. No. 6,109,586, which is incorporated by reference herein in its entirety.

Again referring to FIG. 2, mirror assembly 10 may further include a light module 42 mounted in an opening 44 provided in bottom wall 12a of mirror casing 12. Light module 42 may provide ground illumination to form a security light or the like. In addition, a signal light may be incorporated into assembly 10. For further details of preferred forms of light module 42 or signal lights which may be incorporated into assembly 10, reference is made to U.S. Pat. Nos. 5,823,654; 5,669,704; 5,497,306; 5,669,705; 5,879,074; and 5,863,116, and pending U.S. patent application Ser. Nos. 09/174,757, entitled UNIVERSAL EXTERIOR VEHICLE SECURITY LIGHT, now U.S. Pat. No. 6,149,287; 09/102,414, entitled VEHICLE EXTERIOR MIRROR SYSTEM WITH SIGNAL LIGHT, now U.S. Pat. No. 6,176,602, all commonly assigned to Donnelly Corporation of Holland, Mich., which are incorporated herein by reference in their entireties.

Mirror casing 12, as noted above, is mounted to a vehicle by mounting bracket or sail 14. In the illustrated embodiment, mounting bracket or sail 14 includes a base 15*a* and a base gasket 15*b*. Extending rearwardly from base 15*a* are a plurality of mounting bosses 15*c* which align with corresponding openings 15*d* provided in base gasket 15*b* to receive a corresponding plurality of mounting fasteners 15*e*, which secure base 15*a* and, in turn, mirror casing 12 to the vehicle, as will be understood by those skilled in the art. Although described as a fixed mirror casing, mirror casing 12 may be pivotally mounted to base 15*a* to provide a break-away mounting, such as described in U.S. Pat. No. 5,949,591, or may be mounted with a power-fold mechanism, and further may comprise an extendable casing, such as described in copending application entitled EXTENDABLE EXTERIOR REARVIEW MIRROR ASSEMBLY FOR VEHICLES, Ser. No. 09/399,875, now U.S. Pat. No. 6,116,743, which references are commonly assigned to Donnelly Corporation, and which are hereby incorporated by reference in their entireties.

Figure 5:
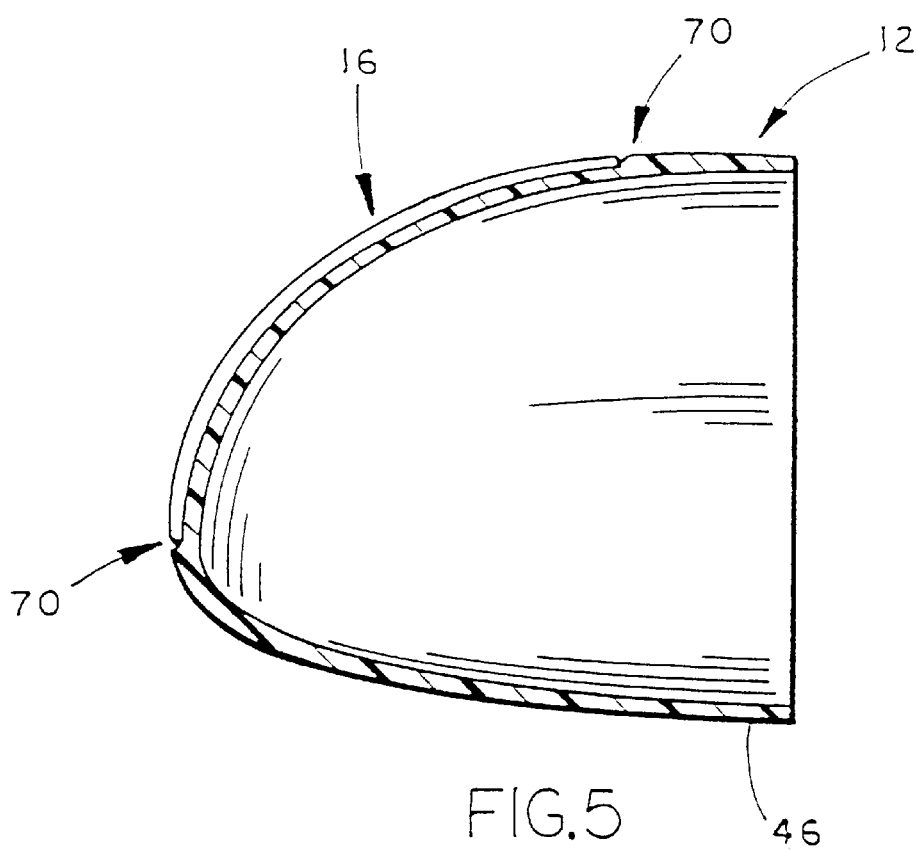
FIG. 5 is a cross-section taken along line V—V of FIG. 3.
Figure 6:
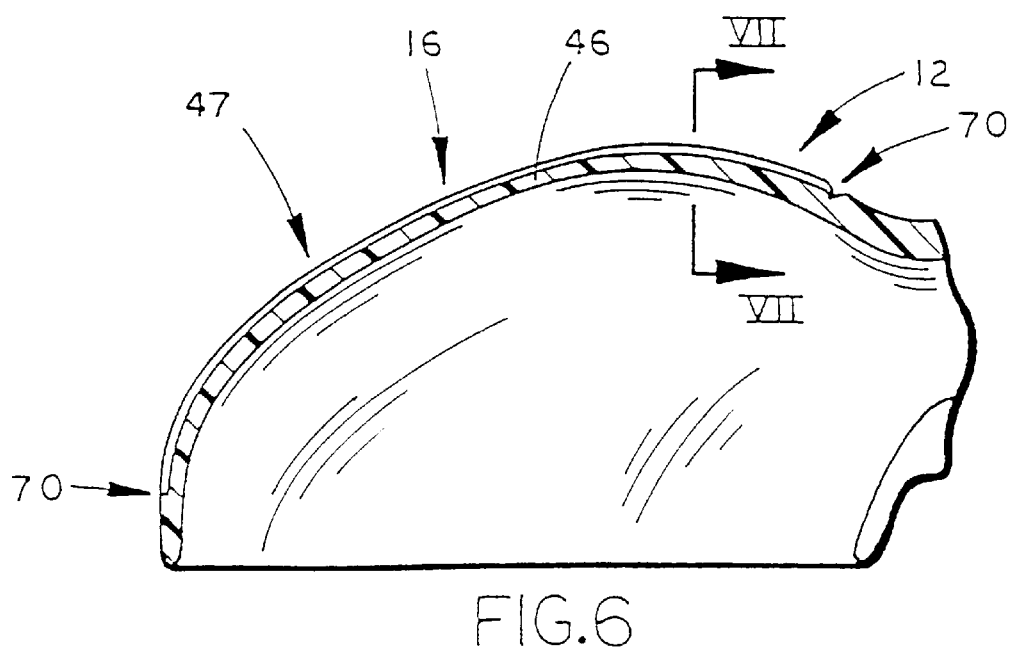
FIG. 6 is an enlarged cross-section taken along line VI—VI of FIG. 3.

Referring to FIGS. 5 and 6, mirror casing 12 includes a casing wall 46 which defines rearward facing opening 18 and a forward facing portion 47 when assembly 10 is mounted to a vehicle. As used herein, the terms "rearward facing" and "forward facing" are used to define directions relative to a vehicle when the mirror assembly is mounted to the vehicle. "Rearward facing" means the object is facing the rear of the vehicle. "Forward facing" means that the object is facing toward the front end of the vehicle. Forward facing portion 47 includes film appliqué 16 which provides an aesthetic appearance for assembly 10 and, preferably as noted above, matches the vehicle body paint color or provides an accent color or treatment, such a wood grain finish, metallic finish, or the like. Film appliqué 16 is molded with housing 11 during the mirror casing molding process, as will be more fully described in reference to the mold apparatus illustrated in FIG. 8, and, under the heat of molding, adheres to the substrate forming housing 11, for example to casing wall 46.

Figure 7:
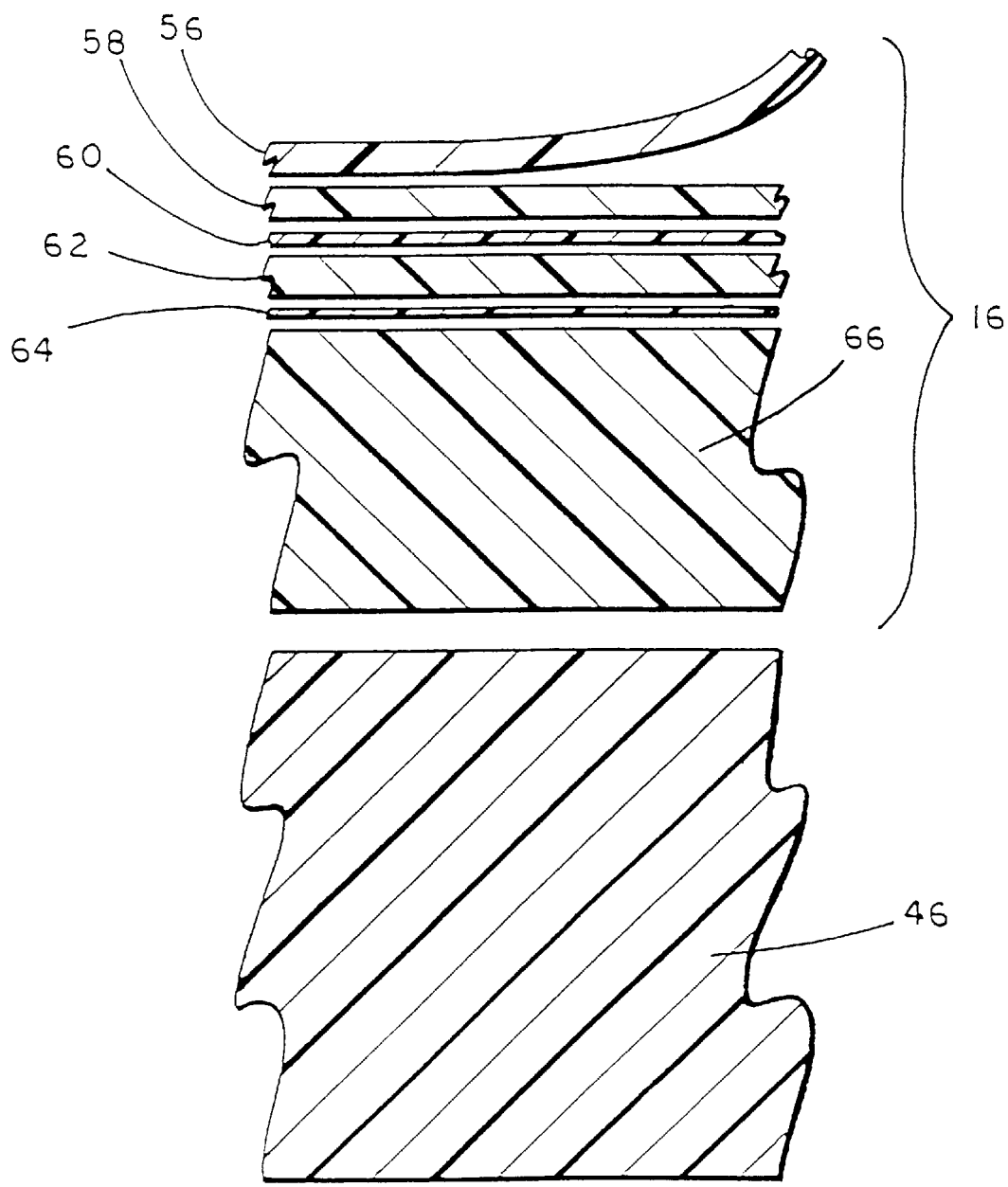
FIG. 7 is an enlarged exploded cross-section taken along line VII—VII of FIG. 6.

Film appliqué 16 preferably comprises a pre-formed film laminate, which is a composite of continuous cast coatings that are dried and laminated onto an extruded gel-free thermal plastic backing sheet and commercially available, for example, from Rexam or Avery Dennison. As best seen in FIG. 7, film appliqué 16 includes an outer coating or carrier sheet 56, for example, a PET carrier sheet having a variable thickness, for example in a range of about 0.5 to 5.0 mils, more preferably, in a range of about 1.0 to 3.0 mils and, most preferably, in a range of about 1.5 to 2.5 mils. "Mils" as used herein is a conventional term meaning a thousandth of an inch. Carrier sheet 56 preferably comprises a flexible formable heat resistant polyester film on which paint films may be cast and dried. Under outer coating 56, film 18 includes a clear coat 58 having a thickness in a range, for example of about 0.25 to 4.0 mils, more preferably, about 0.5 to 3.0 mils and, most preferably about 1.0 to 2.0 mils. Clear coating 58 is preferably a dried continuous cast coating of acrylic polyvinylidene diflouride (PVDF) clear coat. Film appliqué 16 may also include a design coating 60, for example a GRAVURE printed design. Under coating 60 or coating 58, film 18 includes a base color coating 62, such as PVDF acrylic base color coating having a thickness in a range of about 0.1 to 5.0 mils, more preferably, about 0.25 to 3.0 mils, and, most preferably, about 0.5 to 1.5 mils, for example. In addition, film 18 includes a size or adhesion promoter coating 64 having a thickness in a range of about 0.025 to 0.3 mils, more preferably, about 0.05 to 0.2 mils and, most preferably, about 0.075 to 0.15 mils, which is then laminated onto a thermal plastic backing sheet 66. Coating 64 is preferably a dried continuous cast coating of a thermal plastic adhesion promoter. Backing sheet 66 preferably comprises an ABS or TPO material having a variable thickness, for example, in a range from approximately 10 to 40 mils, more preferably, about 12 to 28 mils and, most preferably, about 15 to 25 mils.

Figure 4:
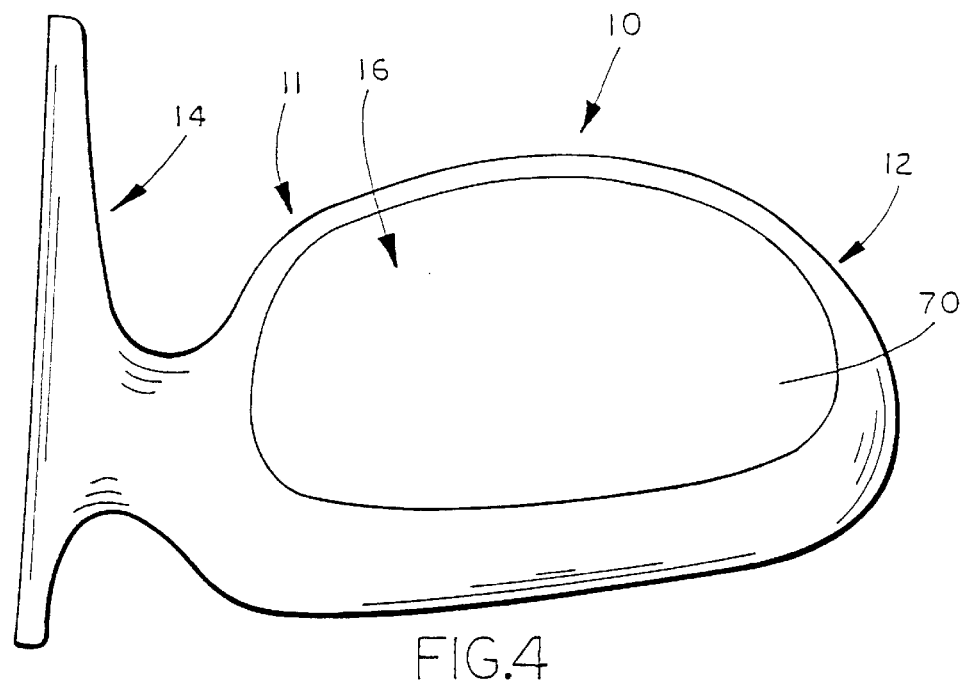
FIG. 4 is a rear elevation view of exterior sideview mirror assembly of FIG. 1.

As best seen in FIGS. 3 and 4, when molded, casing 12 includes a decorative outer surface 68 formed by film appliqué 16. In preferred form, film appliqué 16 is molded on casing wall 46 in a manner to produce a styling feature 70 which simulates the appearance of a mirror assembly incorporating a detachable skull cap design. In addition, the styling feature hides the edge of film appliqué 16 providing a pleasing aesthetic appearance to casing 12. Appliqué 16 provides a generally continuous smooth outer surface for casing 12 and, further, provides a decorative surface which preferably generally matches the color of the vehicle body or provides an accent color, a wood grain appearance or a metallic appearance as described above. As a result, film appliqué 16 produces the same styling affect as detachable skull cap assembly designs without the associated wind noise, since the root cause of the wind noise—the gap between the skull cap and the housing—s essentially eliminated.

Casing 12 is preferably formed by a high pressure and/or high temperature injection mold apparatus 110. Referring to FIG. 8, molding apparatus 110 comprises a single mold apparatus and includes first and second molding plates or platens 112 and 114, respectively, with each platen including a facing surface defining first and second parting lines 116 and 118, respectively. Platens 112 and 114 are respectively configured to define a mold cavity 120 between their respective facing surfaces. A first surface 120*a* of mold cavity 120 is configured for forming an exterior surface of casing 12 and, therefore, has a generally concave shape. A second surface 120*b* of mold cavity 120 is configured for forming the inner surface of casing 12 and, therefore, has a generally convex shape. Although illustrated as a vertical mold apparatus, it should be understood, that the orientation of platens 112 and 114 may be changed. For example, the platens 112 and 114 may comprises side plates which move along a horizontal axis or the mold cavity may be inverted.

Mold apparatus 110 is preferably adapted to hold film appliqué 16 in mold cavity 120. For example, first surface 120*a* may include a discontinuity 122, such as a peripheral raised ridge, which is sized to encircle the film appliqué and defines a recessed holding area or space in which film appliqué 16 is positioned prior to molding. In this manner, discontinuity 122 at least partially assists in holding film appliqué 16 in mold cavity 120 when the molding material is injected into the mold cavity. Thus, film appliqué 16 will remain in its proper position within the mold cavity during molding. The polymer resin forming the housing is injected into cavity 120 by a runner system 124 which is in fluid communication with mold cavity 120 through an injection port or gate and, further, in communication with a nozzle (not shown) of a conventional injection apparatus. Preferably, runner system 124 is centrally located and configured within the first or lower platen 114 to direct the polymer resin into mold cavity 120 through one or more ports or gates provided on a second surface 120*b* of mold cavity 20 so that the polymer will be injected behind the film appliqué 16, as will be understood by those skilled in the art. In this manner, the resin material is injected uniformly into mold cavity 120 to form housing 11 to which film appliqué 16 adheres under the heat of molding to form a unitary or integrally molded composite mirror housing. Upon filling of mold cavity 120 and after completing appropriate temperature and/or pressure process cycles, which varies depending on the material forming housing 11, mold apparatus 110 is then opened so that the molded composite mirror housing 11 can then be removed for installation.

It should be understood that other devices or methods may assist in holding film appliqué 16 in mold cavity 120. For example, first mold plate 112 may include one or more transverse passages 112a, 112b, and 112c through which a vacuum may be directed to upper surface 16a (as viewed in FIG. 8) of film appliqué 16 to thereby form a vacuum chuck or vacuum hold on film appliqué 16. Alternately, a gas may be injected into mold cavity 120 to conform film appliqué 16 to surface 120a of mold cavity 120 prior to injecting the polymer into cavity 120. In addition, mold apparatus 110 may be heated to conform film appliqué 16 to surface 120a of cavity 120.

To enhance the adhesion of film appliqué 16, a primer may be applied to the side of the film onto which the polymer resin is to be injected. Such adhesion promoting primers include, for example silane, silane coupling agents, and titanium coupling agents. Suitable silane coupling agents include Z-6020, Z-6030, Z-6032, Z-6040, Z-6075, and Z-6076, available from Dow Corning Corp. of Midland, Mich. Preferably, the adhesive promoter comprises an organic based portion and an inorganic based portion. As would be understood, film appliqué 16 adheres to the substrate forming casing wall 46 by at least one of mechanical adhesion, physical adhesion, and chemical adhesion.

Figure 9:
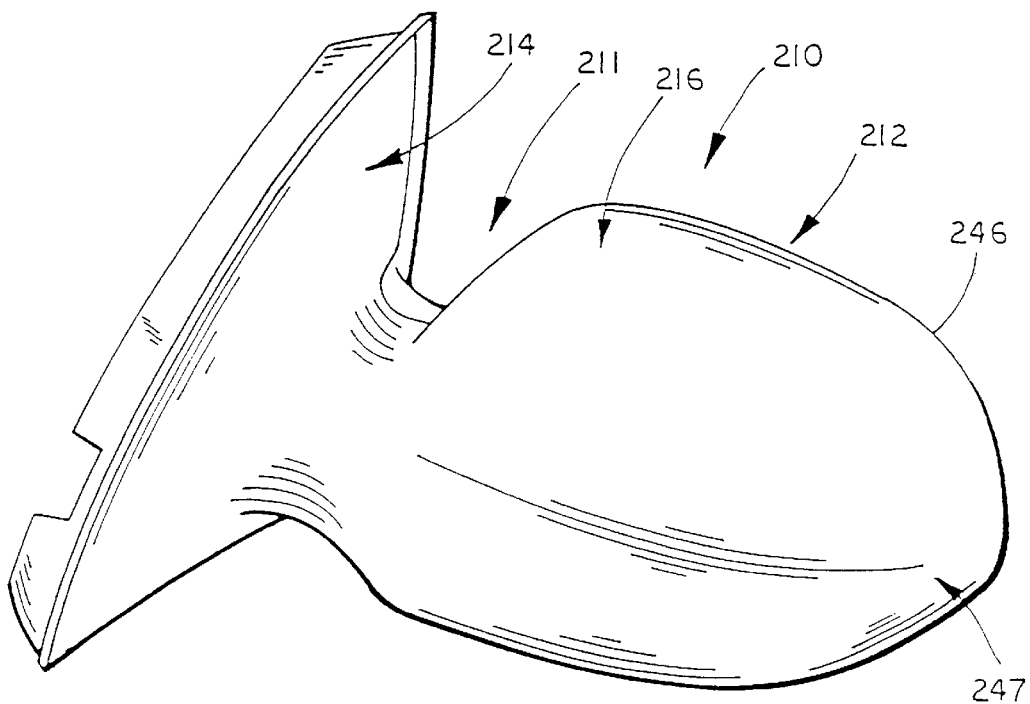
FIG. 9 is a perspective view of a second embodiment of an exterior rearview mirror assembly of the present invention.
Figure 10A:
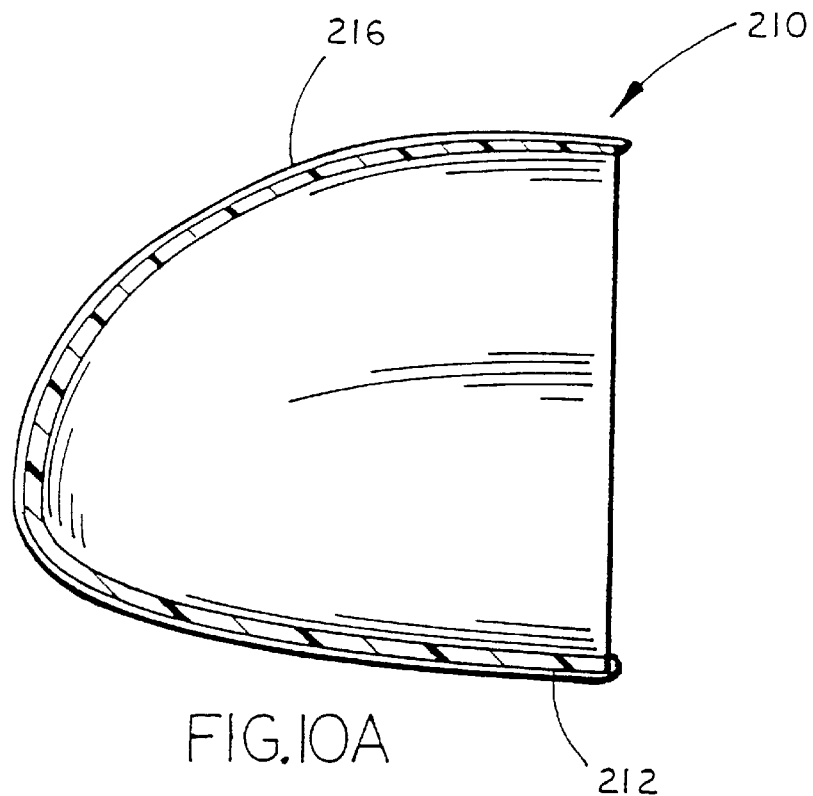
FIG. 10A is a cross-section taken along line XA—XA of FIG. 9.
Figure 10B:
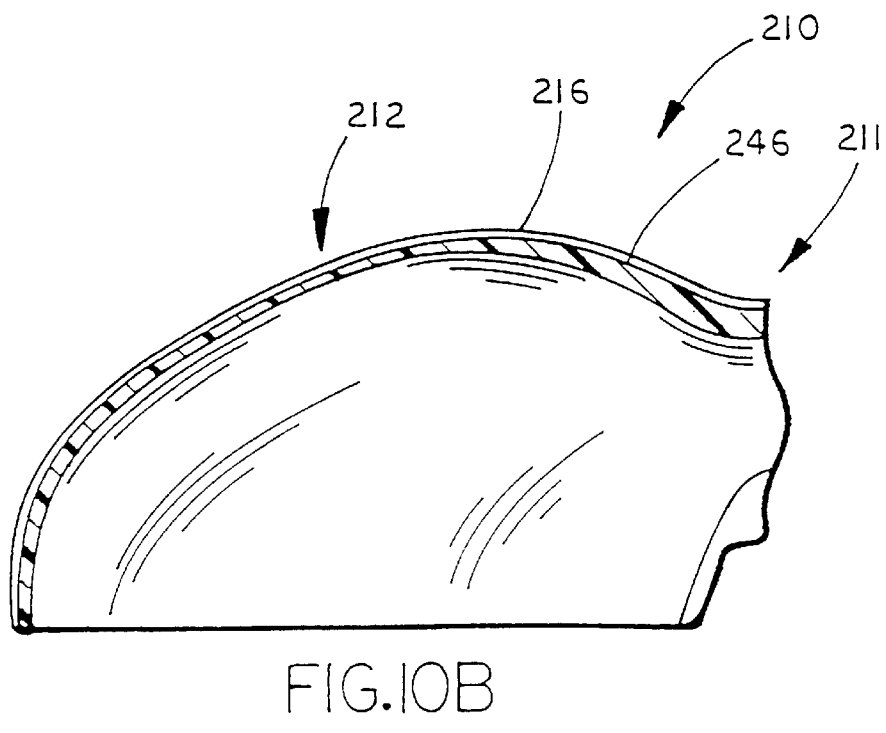
FIG. 10B is a cross-section taken along line XB—XB of FIG. 9.

Referring to FIGS. 9, 10A, and 10B, a second embodiment 210 of an exterior mirror assembly of the present invention is illustrated. Mirror assembly 210 includes a housing 211 which comprises a mirror casing 212 and a mounting sail 214 similar to the previous embodiment. Mirror assembly 210 includes a reflective element assembly and, preferably, an actuator also similar to the previous embodiment. Therefore, reference is made to the first embodiment for a further description of the preferred and optional components supported or housed in housing 211.

In the illustrated embodiment, housing 211 is formed by a housing wall 211a which is molded with an in-mold film appliqué 216. For further description of film 216, reference is made to film appliqué 16. Film appliqué 216 is molded with the polymer substrate forming housing wall 211a in a manner to substantially cover the entire exterior surface of housing 211. In this manner, casing 212 and sail 214 are both decorated with film appliqué 216.

Housing 211 is preferably formed by a high pressure and/or high temperature injection mold apparatus 310. Referring to FIG. 11, molding apparatus 310 comprises a single mold apparatus and includes first and second molding plates or platens 312 and 314, respectively, with each platen including a facing surface defining first and second parting lines 316 and 318, respectively. Platens 312 and 314 are respectively configured to define a mold cavity 320 between their respective facing surfaces. A first surface 320a of mold cavity 320 is configured for forming an exterior surface of housing 211 and, therefore, has a generally concave shape. A second surface 320b of mold cavity 320 is configured for forming the inner surface of housing 211 and, therefore, has a generally convex shape.

First surface 320a includes a discontinuity 322, such as a peripheral raised ridge, which is sized to encircle the outer surface of housing 211 and defines a recessed holding area or space in which film appliqué 216 is positioned prior to molding. In this manner, when the molding material is injected into the mold cavity, film appliqué 216 will be at least partially held in place by discontinuity 322 and remain in its proper position within the mold cavity. Alternately, film 216 may extend between first and second platens 312 and 314, which anchor film appliqué 216 during molding. In addition, first platen 312 may include one or passages 312a, 312b, 312c which may be used to apply a vacuum to film appliqué 216 to hold film appliqué 216 in place as described in reference to mold apparatus 110. As described in reference to the previous embodiment, air or gas may be injected into the mold cavity prior to injecting the polymer to conform the film appliqué to surface 320a of mold cavity to thereby assist in holding film appliqué 216 during molding.

The polymer resin forming the casing wall is injected into cavity 320 by a runner system 324 which is in fluid communication with mold cavity 320 through one or more injection ports or gates and, further, in communication with a nozzle (not shown) of a conventional injection apparatus. Preferably, runner system 324 is centrally located and configured within the second or lower platen 314 to direct the polymer resin into mold cavity 320 through one or more ports or gates provided on a second surface 320b of mold cavity 320 so that the polymer will be injected behind the film appliqué 216, as described in reference to the first embodiment. In this manner, film appliqué 216 at least substantially covers the entire exterior surface of housing 211. Furthermore, discontinuity 322 forms a recessed area into which the film appliqué and the polymer forming the housing substrate extends so that film appliqué 216 wraps into the interior of housing 211. In this manner, the edge of the film appliqué is not readily visible when mirror assembly 210 is assembled. Where film appliqué 216 is extended between facing surfaces 316 and 318 of platens 312 and 316, excess film appliquémay be trimmed.

It should be understood from the foregoing that the present invention provides a one part mirror housing or casing that has a decorative portion which preferably either matches vehicle body paint or provides an accent color or treatment that compliments the vehicle body paint. The decorative housing is achieved using an in-mold film appliqué, which is placed directly into the mold apparatus forming the housing. As a result, the separate processes of molding a skull cap and post attaching the skull cap are eliminated. In addition, the film appliqué exhibits increased adhesion to the substrate forming the housing than decorative finishes using conventional painting systems and, further, increased resistance to weathering, chemical degradation, and abrasion, including chipping.

While one form of the invention has been shown and described other variations and modifications may be made without departing from the scope of the invention. For example, though exemplary configurations and materials have been provided, the configurations and materials may be varied to achieve similar results. Furthermore, though the sideview exterior mirror assembly has been illustrated in a fixed mounting arrangement, the casing of the present invention may be incorporated into a wide variety of mirror assemblies including extendable mirrors, break-away mirrors and, further, power-fold mirrors, which are commonly known in the art. In addition, while reference is made to an injection molding apparatus other molding apparatus may be used, including for example reaction injection molding apparatus, transfer molding apparatus, or the like. In these cases, the adherence of the film appliqué is achieved through chemical adherence or physical adherence of the film appliqué to the substrate forming the casing wall. Although several examples of features and accessories for the mirror assembly have been described, it should be understood that numerous other features or devices may be incorporated into the mirror assembly.

The above descriptions are considered the preferred embodiment only. Modification of the invention will occur to those skilled in the art and to those who make or use the invention. Therefore, it is understood that the embodiment shown in the drawings and described above are merely for illustrative purposes only and are not intended to limit the scope of the invention which is defined by the claims which follow as interpreted according to the principals of patent law including the Doctrine of Equivalents.

I claim:

1. A method of forming a housing for a vehicle mirror assembly comprising:

providing a molding apparatus having a mold cavity;

placing a film appliqué in the mold cavity; and injecting a polymer substrate into the mold cavity over at least a portion of a side of the film appliqué to form a housing wall wherein the film appliqué adheres to the substrate forming the housing wall.

2. The method of forming a housing according to claim 1, wherein the film appliqué adheres to the substrate by at least one of mechanical adhesion, physical adhesion, and chemical adhesion.

3. The method according to claim 1, wherein said providing a molding apparatus includes providing an injection molding apparatus, said injecting includes injecting a heated polymer into the mold cavity.

4. The method according to claim 3, wherein the film adhesion is assisted by heat in the mold cavity.

5. The method according to claim 1, further comprising restraining said film appliqué in the mold cavity when injecting the polymer substrate into the mold cavity.

6. The method according to claim 5, further comprising configuring the mold cavity to restrain the film appliqué in the mold cavity when injecting the polymer substrate into the mold cavity.

7. The method according to claim 6, wherein said configuring includes forming a projection on a side of the cavity, the projection assisting holding the film appliqué in the mold cavity.

8. The method according to claim 7, wherein said forming a projection includes forming a ridge around at least a portion of an area of the side of the cavity, the area being sized to assist holding the film appliqué in the mold cavity.

9. The method according to claim 8, wherein said forming includes forming a peripheral ridge around the area.

10. The method according to claim 5, wherein said restraining includes applying a vacuum hold on the film appliqué.

11. The method according to claim 5, wherein said restraining includes conforming the film appliqué to a portion of the mold cavity.

12. The method according to claim 11, wherein said conforming includes injecting a gas into the mold cavity to conform the film appliqué to the portion of the mold cavity prior to injecting the polymer.

13. The method according to claim 1, wherein said injecting a polymer substrate includes injecting a polymer substrate substantially over an entire side of the film appliqué.

14. The method according to claim 1, further comprising providing an adhesion promoter on the portion of the film appliqué.

15. A housing for a vehicle mirror assembly formed according to the method of claim 1.

16. A housing for a vehicle mirror assembly formed according to the method of claim 2.

17. A housing for a vehicle mirror assembly formed according to the method of claim 13.

18. The method according to claim 1, wherein said placing a film appliqué includes placing a pre-formed film appliqué in a mold cavity.

19. The method according to claim 1, wherein said placing a film appliqué comprises placing a decorative film appliqué to provide a decorative function for the mirror assembly.

20. The method according to claim 19, wherein said placing a film appliqué includes placing a pre-formed decorative film appliqué to provide a decorative function for the mirror assembly.

21. The method according to claim 1, wherein said placing a film appliqué includes placing a film appliqué which comprises a laminate including at least one backing sheet and at least one coating over said backing sheet.

22. The method according to claim 21, further comprising matching the coating with the vehicle body paint.

23. The method according to claim 22, further comprising providing an accent color with said coating.

* * * * *

UNITED STATES PATENT AND TRADEMARK OFFICE
CERTIFICATE OF CORRECTION

PATENT NO. : 6,447,130 B2
DATED : September 10, 2002
INVENTOR(S) : Tun-Jen Chu

It is certified that error appears in the above-identified patent and that said Letters Patent is hereby corrected as shown below:

Column 8,
Line 23, "s" should be -- is --

Column 10,
Line 34, "appliquémay" should be -- appliqué may --
Line 41, "qué ," should be -- qué, --

Signed and Sealed this

Twenty-sixth Day of October, 2004

JON W. DUDAS
*Director of the United States Patent and Trademark Office*